(12) United States Patent
Wu

(10) Patent No.: US 7,047,348 B2
(45) Date of Patent: May 16, 2006

(54) METHOD AND ARCHITECTURE FOR ACCESSING HARDWARE DEVICES IN COMPUTER SYSTEM AND CHIPSET THEREOF

(75) Inventor: Chung-Cheng Wu, Taipei (TW)

(73) Assignee: VIA Technologies, Inc., Taipei (TW)

( * ) Notice: Subject to any disclaimer, the term of this patent is extended or adjusted under 35 U.S.C. 154(b) by 411 days.

(21) Appl. No.: 10/128,471

(22) Filed: Apr. 22, 2002

(65) Prior Publication Data

US 2002/0178320 A1    Nov. 28, 2002

(30) Foreign Application Priority Data

May 28, 2001    (TW)    ............................... 90112820 A

(51) Int. Cl.
*G06F 13/36*    (2006.01)
*G06F 13/00*    (2006.01)
*G06F 13/14*    (2006.01)
*G06F 13/20*    (2006.01)

(52) U.S. Cl. ................. 710/315; 710/110; 710/312; 710/306; 710/313; 710/305

(58) Field of Classification Search .............. 710/110, 710/305, 306, 313, 312
See application file for complete search history.

(56) References Cited

U.S. PATENT DOCUMENTS

| | | | | |
|---|---|---|---|---|
| 5,309,567 A | * | 5/1994 | Mizukami ................... 710/110 |
| 5,655,131 A | * | 8/1997 | Davies ......................... 712/34 |
| 5,978,879 A | * | 11/1999 | Harumoto et al. .......... 710/311 |
| 5,991,833 A | * | 11/1999 | Wandler et al. ............... 710/52 |
| 6,000,043 A | * | 12/1999 | Abramson .................... 714/44 |
| 6,009,479 A | * | 12/1999 | Jeffries .......................... 710/8 |
| 6,073,190 A | * | 6/2000 | Rooney ........................ 710/56 |
| 6,076,128 A | * | 6/2000 | Kamijo et al. .............. 710/312 |
| 6,078,742 A | * | 6/2000 | Chow ........................... 703/25 |
| 6,119,192 A | * | 9/2000 | Kao et al. .................... 710/311 |
| 6,138,192 A | * | 10/2000 | Hausauer .................... 710/100 |
| 6,292,865 B1 | * | 9/2001 | McTague et al. ........... 710/262 |
| 6,496,888 B1 | * | 12/2002 | Pole, II ....................... 710/110 |
| 6,530,001 B1 | * | 3/2003 | Lee ............................. 711/154 |
| 6,594,721 B1 | * | 7/2003 | Sakarda et al. ............. 710/304 |
| 2001/0018721 A1 | * | 8/2001 | McKenna et al. .......... 710/126 |
| 2003/0023803 A1 | * | 1/2003 | Zatorski ..................... 710/306 |

OTHER PUBLICATIONS

"System Management Bus Specification," Dec. 11, 1998, Smart Battery System Specifications, Rev. 1.1, p. 1-39.*

* cited by examiner

*Primary Examiner*—Rehana Perveen
*Assistant Examiner*—Faisal Zaman

(57) ABSTRACT

A method and an architecture for accessing hardware devices in a computer system and the chipset thereof are provided. A bi-directional two-wired serial interface, for instance, a system management bus (SMB), is configured to connect an I/O device, such as a local area network adapter, to a system controller such as a southbridge or a northbridge chipset. The I/O device which includes a SMB master controller serves as a SMB master device for generating a clock signal and transmitting a data signal defined by the SMB protocol to the system controller according to the clock signal. The system controller which includes a PCI master and a SMB slave controller serves as a SMB slave device for receiving commands and data bytes in the data signal from the SMB master device to drive the PCI master to access the register block of peripherals and system memory of the computer system.

38 Claims, 5 Drawing Sheets

METHOD AND ARCHITECTURE FOR ACCESSING HARDWARE DEVICES IN COMPUTER SYSTEM AND CHIPSET THEREOF

FIELD OF THE INVENTION

The present invention is related to a method and an architecture for accessing hardware devices in a computer system and the chipset thereof. In particular, the present invention is related to a method and an architecture for accessing the register block of peripherals and the system memory of a computer system by means of a bi-directional two-wired serial interface such as a system management bus.

BACKGROUND OF THE INVENTION

With the highly development of the computer technology, a variety of I/O buses of high data transmission bandwidth and high data transmission throughput has come out to facilitate the data transmission between the processor and the peripherals. In a computer system, the motherboard is used to set up a plurality of electronic elements, such as the processor slot, memory module slot or system bus slot. For the current computer system, the PCI (peripheral component interconnect) bus is the most widely used system I/O bus for interconnecting numerous peripherals in a computer system. The PCI bus is advantageous in terms of high data transmission bandwidth and high data transmission throughput, and it has been commonly adopted by all the computer manufacturers as a standard system I/O bus in a computer system.

Formerly, the debug operation for the motherboard is carried out by virtue of a debug card. However, the debug card is a PCI device which can be plugged into the PCI slot of the computer system, and it is incapable of getting aware of the status of other interface cards. In addition, if the error message from the peripherals of the computer system is detected, it can not provide the remote server with a gateway to repair the defective peripherals in the computer system. As a result, the configuration settings of a conventional debug card is quite disadvantageous to the remote repair operation.

In recent years, the system management bus (also referred to as SMBus or SMB) has been gradually introduced into the computer system to serve as a data transmission interface for power management operation or system monitoring tasks. As is well known in the art, the system management bus is capable of permitting up to 128 peripherals to communicate with other peripherals in the computer system. If the known system management bus can be taken as a communication interface for detecting the status of peripherals of the computer system and simulating the function of peripherals, it would become a global solution for obviating the drawbacks in performing the system monitoring process and remote repair operation by way of a conventional I/O device such as a debug card.

SUMMARY OF THE INVENTION

It is, therefore, an object of the present invention to provide an architecture for accessing the register block of peripherals and the system memory of a computer system by system management bus.

It is another object of the present invention to provide a method of accessing the register block of peripherals and the system memory of a computer system by system management bus.

It is a further object of the present invention to provide a system controller which provides an access to the hardware devices in a computer system.

It is still an object of the present invention to provide a way for accessing the register block of peripherals and system memory of a computer system by an I/O device.

In accordance with a first preferred embodiment of the present invention, an architecture for accessing a hardware device of a computer system is provided and comprises a PCI bus which is coupled with the peripherals of the computer system; a system controller, more preferably, a northbridge chipset or a southbridge chipset, which is coupled to the PCI bus and having a PCI master capable of accessing the peripherals that is coupled to the PCI bus; a system management bus (SMB) which is coupled with the system controller; and an I/O device, for example, a local area network (LAN) adapter or a debug card, which is coupled with the system controller by the system management bus and having a SMB master controller for generating a clock signal, and transmitting a data signal defined by the SMB protocol to the system controller through the system management bus, in order to drive the PCI master to access a hardware device of the computer system.

As described hereinbefore, the system controller further includes a SMB interface for communicating with the SMB master controller through the system management bus; a SMB slave controller for receiving a command and a date byte in the data signal from the SMB master controller and driving the PCI master to access a hardware device of the computer system according to the received command and data byte in the data signal; and a data buffer for temporarily storing data being transferred between the PCI master and the SMB slave controller. In addition, in a first preferred embodiment of the present invention, a northbridge chipset which is used to coordinate data transfers among the CPU, the main memory, the video graphic adapter controller (VGA controller) and the PCI bus is coupled with a southbridge chipset by the PCI bus. In this manner, the architecture as proposed by the present invention can be employed to access the CPU, the main memory and the VGA controller of the computer system. Further, the architecture of the present invention can be used for accessing an ISA (industry standard architecture)/LPC (low pin count) device. The ISA/LPC device of the computer system is coupled with the PCI bus through the ISA/LPC bus, and the ISA/LPC bus is coupled with the PCI bus through a PCI-ISA/LPC bus bridge. Preferably, the PCI-ISA/LPC bus bridge is integrated into the southbridge chipset.

In accordance with another preferred embodiment of the present invention, the northbridge chipset and the southbridge chipset are interconnected by a Via Technologies, Inc. V-Link bus, which is dedicated to regulate the data transfers between the northbridge chipset and the southbridge chipset, and the northbridge chipset is not connected with the PCI bus. In accordance with a further preferred embodiment of the present invention, the northbridge chipset and the CPU are integrated into a single chip, in such a configuration that can lead to a great advance in the data transmission rate among the CPU and other peripherals and the promotion of CPU's performance.

In a further step of the present invention, a method for accessing a hardware device of a computer system by a two-wired serial interface, for example, a system management bus, is disclosed and includes the steps of: generating a clock signal and transmitting a data signal defined by a protocol of the two-wired serial interface from a master controller of the two-wired serial interface through the two-wired serial interface according to the clock signal; receiving the clock signal and the data signal by a system controller having a PCI bus master controller and a slave controller of the two-wired serial interface; and according to a command and a data byte in the data signal, driving the PCI bus master controller to access a hardware device of the computer system according to a PCI bus read/write cycle.

In accordance with the present invention, an interface for communicating with the two-wired serial interface is further incorporated into the system controller. The master controller of the two-wired serial interface is included in an I/O device, such as a local area network (LAN) adapter or a debug card.

Now the foregoing and other features and advantages of the present invention will be more clearly understood through the following descriptions with reference to the accompanying drawings, in which:

DETAILED DESCRIPTION OF THE PREFERRED EMBODIMENT

Figure 1:
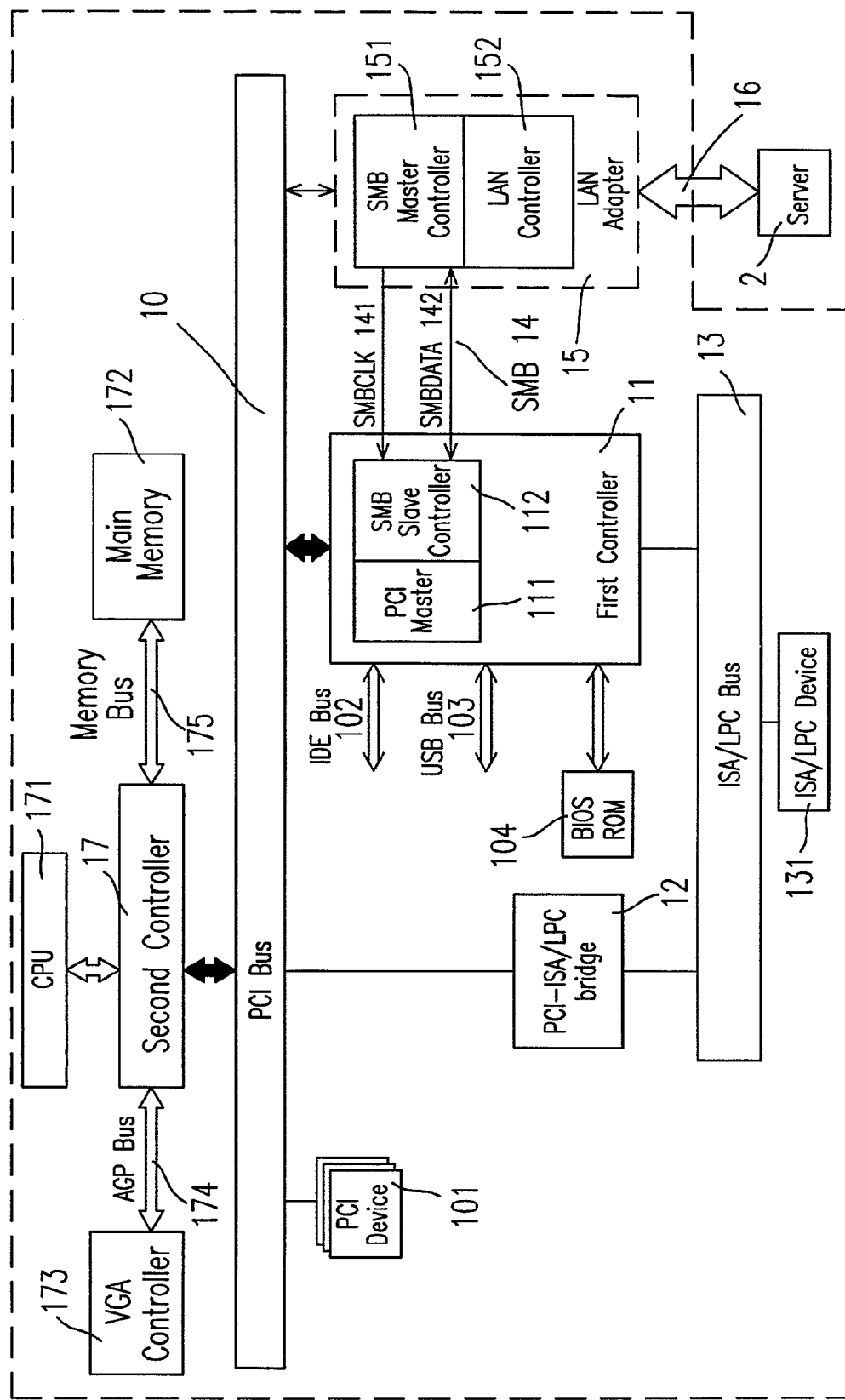
FIG. 1 is a block diagram depicting a computer system according to a first preferred embodiment of the present invention.

FIG. 1 depicts a block diagram of the computer system according to a first preferred embodiment of the present invention. The PCI bus 10 is designed for interconnecting numerous peripherals and serves as a data transmission interface among the processor 171 and other peripherals. The known PCI bus 10 is a 32-bit or 64-bit wide bus, working at a clock frequency of 33 MHz or 66 MHz, with up to 133 MByte/sec maximum throughput. Because the processor 171 can not directly communicate with the main memory 172 and the peripherals of the PCI bus 10, control circuits that include a plurality of decoders and registers must be provided for regulating the data flow directions and data transfers among the processor 171, the main memory 172 and other peripherals. As shown in FIG. 1, a first controller 11 is used to coordinate the data transfers among the PCI bus 10 and the peripherals 101 that are directly coupled to the PCI bus 10, such as SCSI (small computer systems interface) controller, other system I/O buses such as IDE (integrated drive electronics) bus 102, USB (universal serial bus) bus 103, ISA (industrial standard architecture)/LPC (low pin count) bus 13, system management bus (or SMB) 14 and BIOS ROM 104. The first controller 11 is preferably referred to as the designation of southbridge chipset. The first controller 11 is coupled with the ISA/LPC bus 13, and the ISA/LPC bus is coupled with the PCI bus 10 through a PCI-ISA/LPC bus bridge 12. A preferable configuration of the computer system of FIG. 1 is to integrate the PCI-ISA/LPC bus bridge 12 into the first controller 11.

The first controller 11 includes a 5 MB slave controller 112 which is coupled with an I/O device 15 having a SMB master controller 151, for example, a LAN (local area network) adapter or a debug card through a system management bus 14. In this preferred embodiment, the I/O device 15 is designated as a LAN adapter. The first controller 11 is coupled with the ISA/LPC devices 131 through the ISA/LPC bus 13. The ISA/LPC device 131 may include floppy drive controllers, keyboards, serial ports, parallel ports, real time clock (FTC), GPIO (general purpose I/O) and so forth. The data transfers among the PCI bus 10 and the ISA/LPC devices 131 are also in the control of the first controller 11. As depicted in FIG. 1, the computer system 1 further includes a second controller 17 which is coupled with the first controller 11 through the PCI bus 10. The second controller 17 is configured to coordinate the data transfers among the CPU 171, the main memory 172 that is coupled with the second controller 17 by a memory bus 175, the VGA controller 173 that is coupled with the second controller 17 by an AGP (accelerated graphic port) bus 175 and the PCI bus 10. The second controller 17 is preferably referred to as the designation of northbridge chipset.

As is known by a person skilled in the art, the system management bus 14 is a bi-directional, two-wired serial interface which includes a clock signal line SMBCLK 141 and a data signal line SMBDATA 142 for transmitting data between two SMB devices. In accordance with a first preferred embodiment of the present invention, in order to achieve the objectives of accessing the register block of peripherals and the system memory by way of the system management bus 14, a SMB master device is required to generate a clock signal and transmit the clock signal through the SMBCLK signal line to the SMB slave device, and transmit a data signal defined by the SMB protocol through the SMBDATA signal line with reference to the clock signal. A SMB master device indicates the device that can generate clock signals and send commands and data bytes to a SMB slave device with reference to the clock signals. In accordance with a first preferred embodiment of the present invention, the SMB master device is designated as an I/O device such as a LAN adapter 15 including a SMB master controller 151 and a LAN controller 152, and the SMB slave device is designated as the first controller 11 including a PCI master 111 and a SMB slave controller 112. It is worthy to note that the PCI master 111 of the first controller 11 is capable of accessing the main memory 172 and the peripherals of the computer system 1. By taking the LAN adapter 15 as a SMB master device, it can drive the first controller 11 having a PCI master 111 as a SMB slave device to access the peripherals and the system memory. The LAN adapter 15 can drive the first controller 11 by the system management bus 14 to write data into the register block of peripherals or system memory from the PCI master 111, and read out the status information associated with the peripherals and system memory through the system management bus 14.

Figure 2:
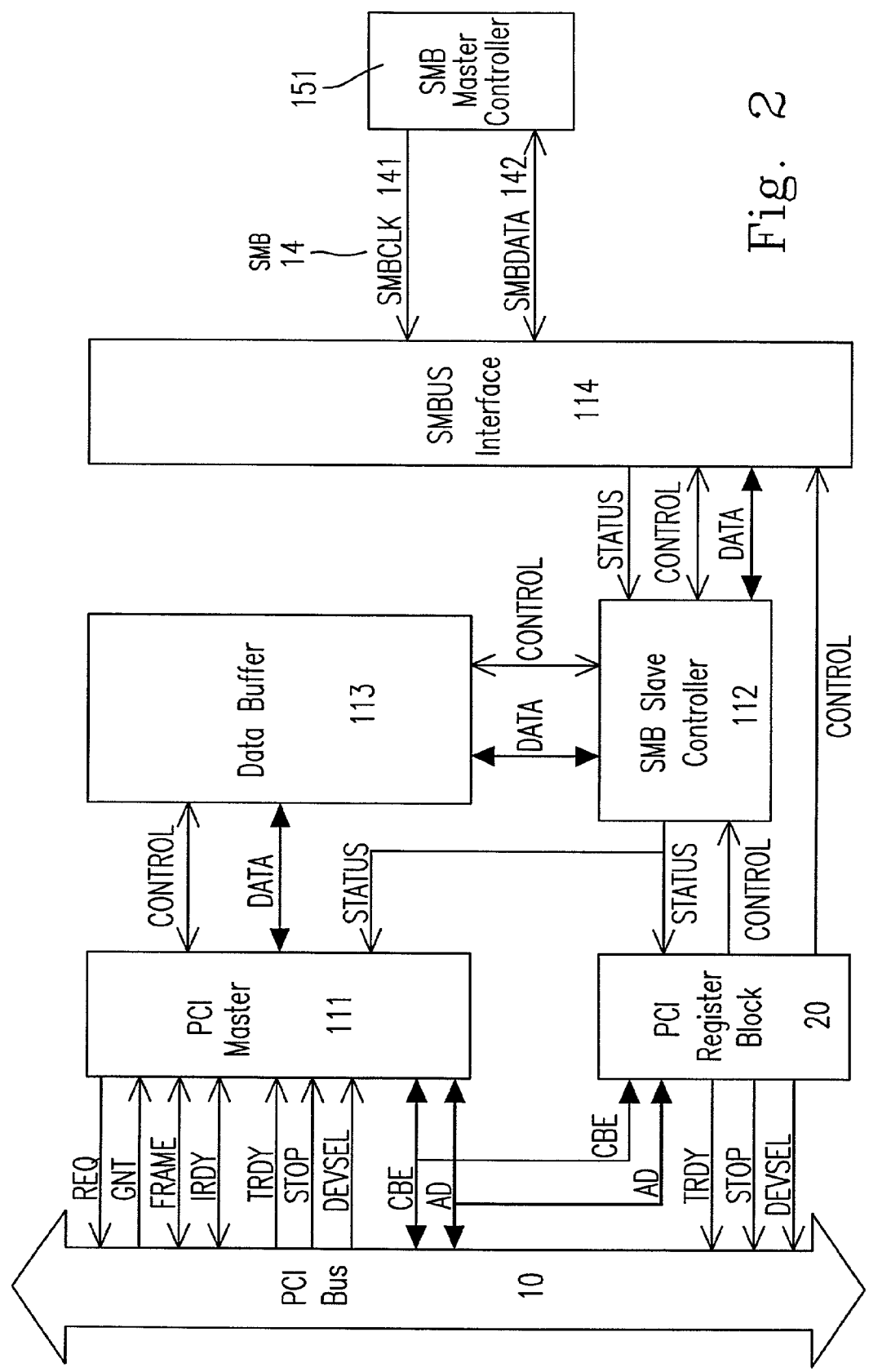
FIG. 2 is a block diagram showing how the SMB slave device having a PCI master accesses the PCI register block according to the present invention.

FIG. 2 is a block diagram showing how the SMB slave device having a PCI master accesses the PCI register block according to the present invention. When the SMB master device (LAN adapter 15) generates a clock signal and transmits a data signal defined by the SMB protocol with reference to the clock signal, the SMB interface 114 will receive the SMB data signal and the SMB clock signal and transfer the command and data byte in the SMB data signal to the SMB slave controller 112. According to the command and data byte received by the SMB slave controller 112, the SMB slave controller 112 will drive the PCI master 111 to access the PCI register block 20 with reference to the PCI bus read/write cycle.

As mentioned above, the PCI master 111 indicates the device that possesses the capability of accessing system memory of peripherals, that is, the PCI master is capable of controlling the control and address signals. When the PCI master 111 desires to access the data of the PCI register block 20, it has to assert a request signal REQ# by the REQ# signal line to request the use of the PCI bus 10 from the hidden bus arbiter of the PCI bus 10 (it does not show in the drawing for simplicity). The hidden bus arbiter of the PCI bus 10 will respond to the request signal from the PCI master 111 with a grant signal GNT#. After the PCI master 111 received the grant signal GNT#, it obtains the bus mastership of the PCI bus 10. In the meantime, the data transaction of the PCI bus can begin. In the beginning, the initiator (PCI master 111) asserts the control signal of FRAME# to indicate that a data transaction is in progress. The data transactions between the PCI master 111 and the PCI register block 20 are carried out in virtue of the control signals of IRDY# (initiator ready), TRDY# (target ready), DEVSEL (device select), and the address/data signals of CBE# (bus command/byte enable) and AD (address/data). The data is read out from the PCI register block 20 or is written into the PCI register block 20 according to the PCI read/write cycle operation. The target (PCI register block 20) may assert a STOP# signal to request the termination of the data transaction. The data buffer 113 is used as a temporary storage for storing the data being transferred between the PCI master 111 and the SMB slave controller 112 therein. With respect to the PCI bus read/write cycle operation, it has become a well-known technique for an ordinary person skilled in the art of local PCI bus operation, and we do not give further details herein. Referring to FIG. 1 again, the first controller 11 and the second controller 17 are interconnected by the PCI bus 10. Therefore the LAN adaptor 15 can drive the PCI master 111 of the first controller 11 through the system management bus 14 to assert the PCI read/write cycle, so as to acquire the status information or monitor the usage condition of the CPU 171, the main memory 172 and the VGA controller 173. Further, the LAN adapter 15 can drive the PCI master 111 of the first controller 11 through the system management bus 14, so as to access the register block of the ISA/LPC device 131 through the PCI-ISA/LPC bus bridge 12 to acquire the status information of the ISA/LPC device 131 or simulate the functions of the ISA/LPC device 131.

Figure 3:
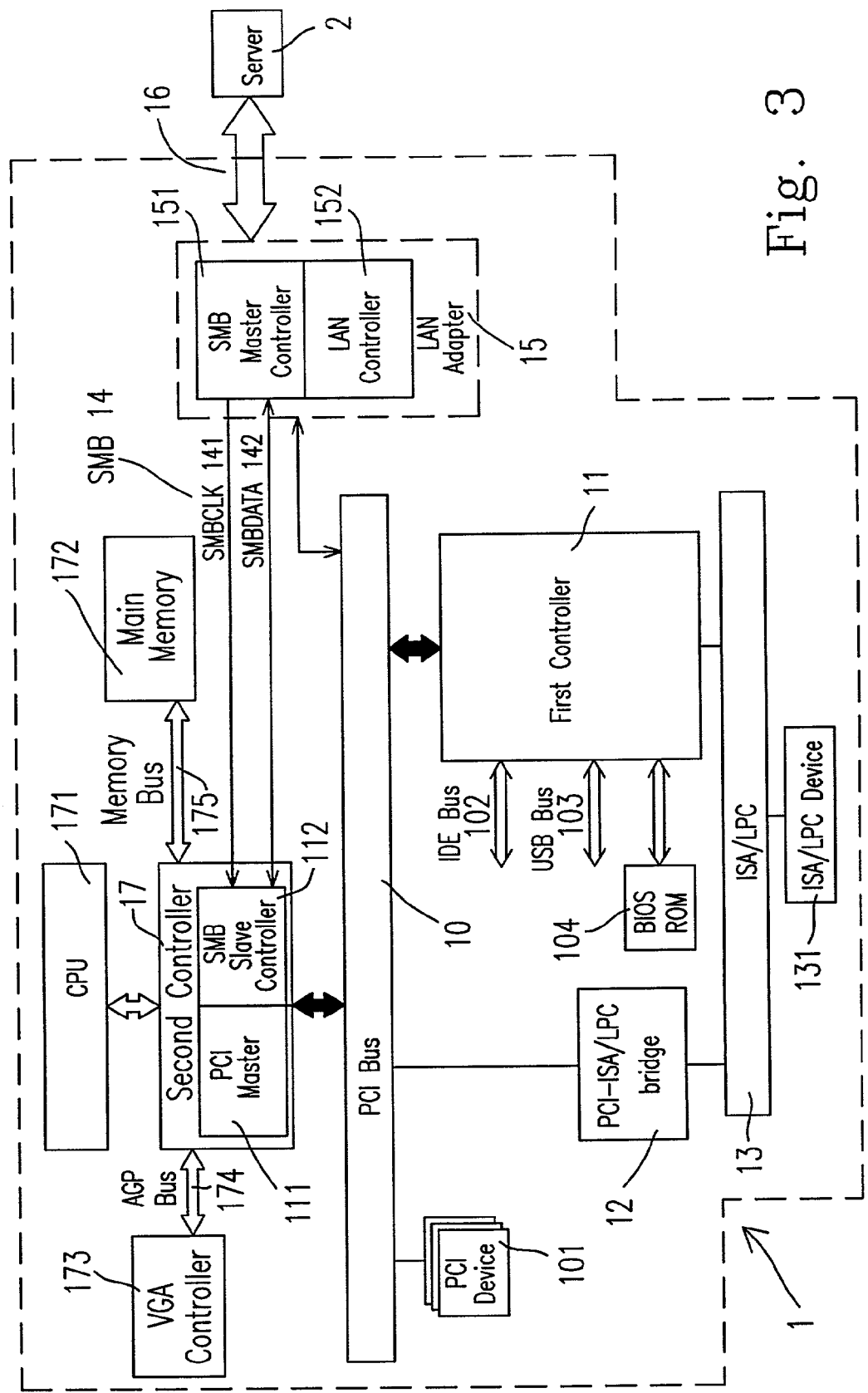
FIG. 3 shows a block diagram of the computer system according to a second preferred embodiment of the present invention.

FIG. 3 schematically shows a block diagram of the computer system according to a second preferred embodiment of the present invention. As can be seen from FIG. 3, the PCI master 111 and the SMB slave controller 112 are integrated into the second controller 17, such that the second controller 17 becomes a bus master with the capability of accessing the system memory and other peripherals. Also the second controller 17 serves as a SMB slave device which communicates with the LAN adapter 15 through the SMB 14. As shown in FIG. 3, the second controller 17 is used to coordinate the data transfers among the CPU 171, the main memory 172 that is coupled with the second controller 17 by a memory bus 175 and the VGA controller that is coupled with the second controller 17 by an AGP bus 174. In this way, the LAN adapter 15 can acquire the status information about the CPU 171, the main memory 172 and the VGA controller 173 and monitor their usage conditions, or access the register block of peripherals that are coupled to the PCI bus 10.

Figure 4:
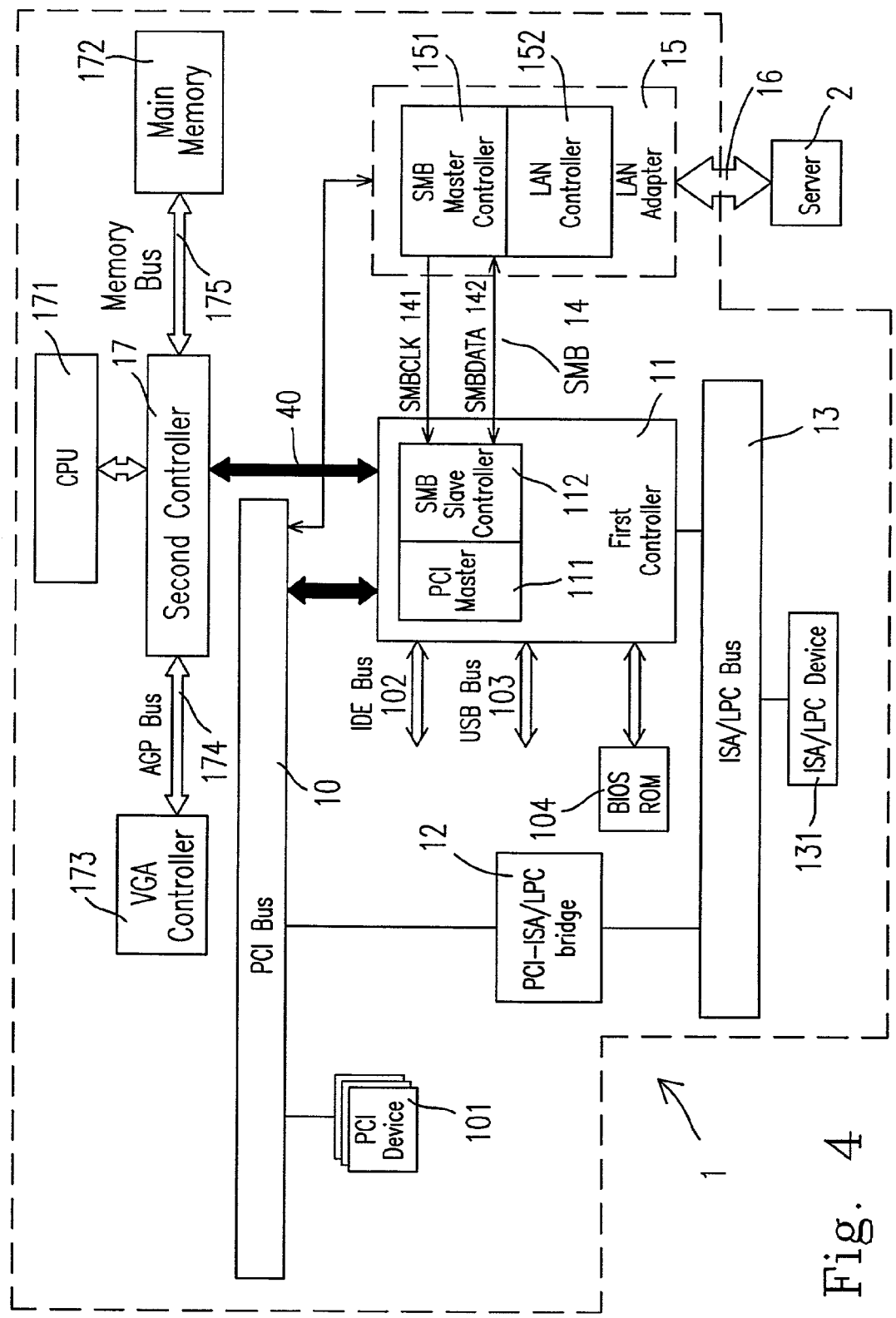
FIG. 4 shows a block diagram of the computer system according to a third preferred embodiment of the present invention.

FIG. 4 shows a block diagram of the computer system according to a third preferred embodiment of the present invention. Comparing the computer system of FIG. 4 with the computer systems of FIGS. 1 and 3, it is found that the first controller 11 and the second controller 17 as shown in FIG. 4 are not interconnected by the PCI bus 10 as the foregoing embodiments, but are interconnected by a proprietary bus 40. The proprietary bus can be, for example, VIA Technologies, Inc. V-Link bus, and it is dedicated to provide the first controller 11 and the second controller 17 with a high speed bus for proceeding to data transfers. The system configuration of FIG. 4 can relax the data transmission throughput on the PCI bus 10 and enhance the performance of the computer system 1.

Figure 5:
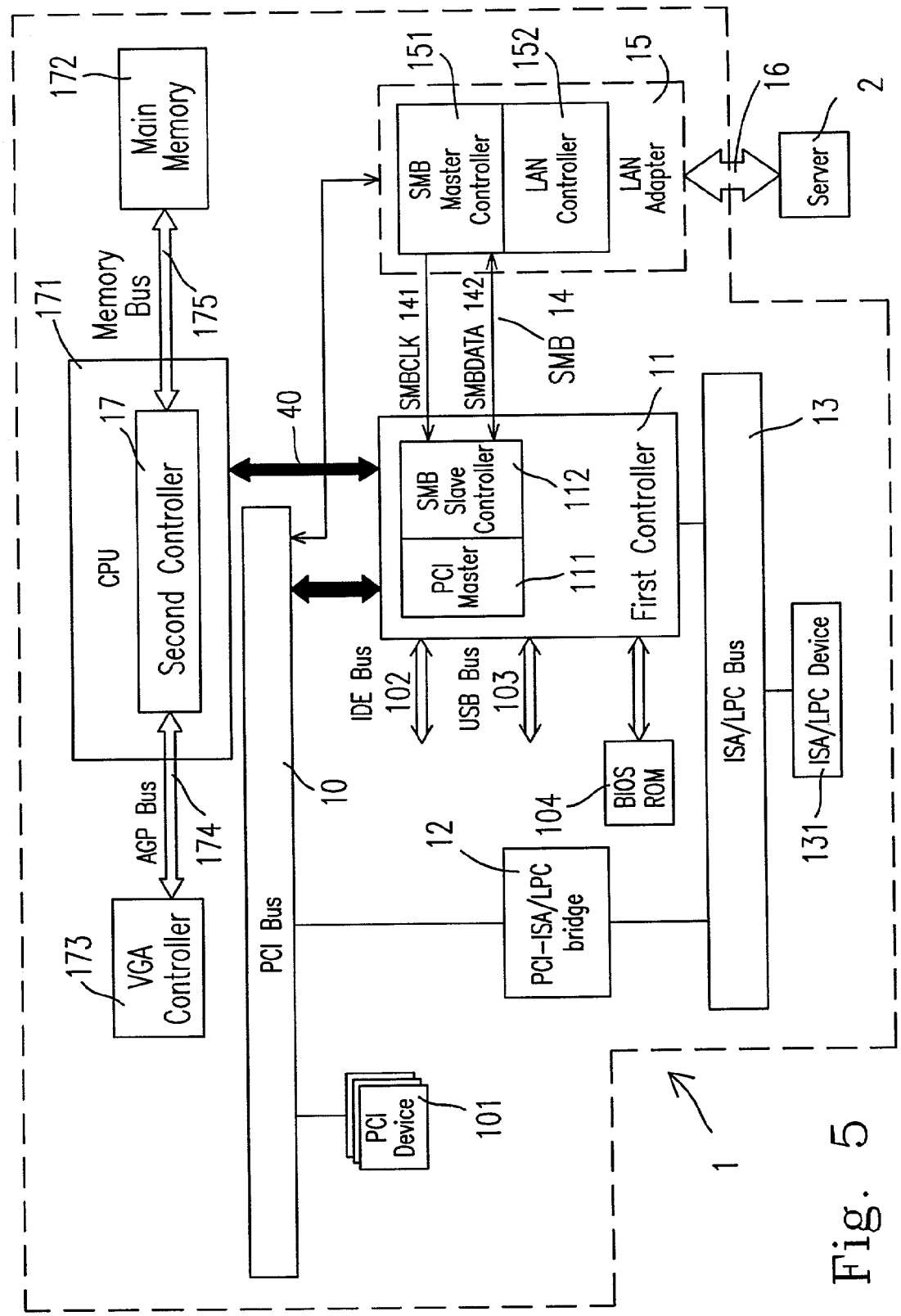
FIG. 5 shows a block diagram of the computer system according to a fourth preferred embodiment of the present invention.

FIG. 5 shows a block diagram of the computer system according to a fourth preferred embodiment of the present invention, in which the CPU 171 and the second controller 17 are integrated into a single chip. The system configuration of FIG. 5 surely can conduce to a great advance in the data transmission rate among the CPU 171 and other peripherals and the promotion of CPU's performance.

It can be readily known from the foregoing embodiments of the present invention that because the PCI master 111 is implemented within the first controller 11 or the second controller 17 and the system management bus 14 is taken as the communication interface for the I/O device of the computer system 1 (such as a LAN adapter 15) and the controller having a PCI master 111, the remote server 2 can control the LAN adapter 15 by the network link of cable 16 to access the register block of peripherals and the system memory of the computer system 1. The present invention provides a global solution to access the register block of all the peripherals and the system memory, which can let the remote monitoring operation or function simulation process of peripherals of the computer system to proceed with an easier way.

To conclude, It is obvious that the present invention provides a gateway to access the register block of peripherals and the system memory of the computer system by the system management bus. According to the present invention, an I/O device which serves as a SMB master device is coupled with the controller which serves as a SMB slave device by system management bus, and the SMB slave device includes a PCI master that has the faculty to access the peripherals and the system memory of the computer system. As a result, the I/O device which serves as a SMB master device can generate clock signals and transmitting a data signal carrying command and data byte to the controller acting as a SMB slave controller with reference to the clock signals, thereby driving the PCI master of the controller to access the register block of peripherals and the system memory of the computer system with reference to the PCI bus read/write cycle operation. Because the system management bus is capable of permitting up to 128 peripherals to communicate with each other, a convenient, low-cost and remote-controllable user interface by using the system management bus as the interface between the I/O device and the system I/O bus master controller can be proffered to a computer user, which is adapted to solve the perpetual defects that the I/O device such as debug card can not let the user know the status of the peripherals of the computer system.

Those of skill in the art will recognize that these and other modifications can be made within the spirit and scope of the present invention as further defined in the appended claims.

What is claimed is:

1. An architecture for accessing a hardware device in a computer system comprising:
   a first bus;
   a second bus with two-wired interface;
   a controller coupled with said first bus and having a master controller of said first bus and a slave controller of said second bus; and
   an input-output device coupled with said first bus and having a master controller of said second bus;
   wherein said second bus is coupled between said input-output device and said controller, said input-output device is configured to generate a clock signal and transmit said clock signal through a first line of said two-wired interface and a data signal defined by a protocol of said second bus through a second line of said two-wired interface to said slave controller of said second bus, in order to drive said master controller of said first bus to access said hardware device.

2. The architecture of claim 1 wherein said first bus is a peripheral component interconnect bus and said second bus is a system management bus.

3. The architecture of claim 1 wherein said controller further comprises a data buffer for temporarily storing data being transferred between said slave controller of said second bus and said master controller of said first bus therein.

4. The architecture of claim 1 wherein said input-output device is one selected from a local area network adapter and a debug card.

5. The architecture of claim 1 wherein said controller is a southbridge chipset.

6. The architecture of claim 1 wherein said controller is configured to respectively coordinate data transfers among a central processing unit, a main memory, a video graphic adapter controller and said first bus.

7. The architecture of claim 6 wherein said controller is a northbridge chipset.

8. The architecture of claim 7 wherein said controller and said central processing unit are integrated into a single chip.

9. The architecture of claim 6 wherein said hardware device comprises one selected from a group consisting of said video graphic adapter controller, said main memory and said central processing unit.

10. The architecture of claim 1 wherein said hardware device is coupled with said first bus.

11. The architecture of claim 1 wherein said hardware device is coupled with said first bus through a third bus and a bus bridge device.

12. The architecture of claim 11 wherein said bus bridge device is integrated into said controller.

13. The architecture of claim 11 wherein said third bus is one of an industry standard architecture bus and a low pin count bus.

14. The architecture of claim 1 wherein said input-output device is configured to transmit said data signal to said slave controller of said second bus with reference to said clock signal, in order to drive said master controller of said first bus to access said hardware device according to a command and a data byte in said data signal.

15. An architecture for accessing a hardware device in a computer system comprising:
   a first bus;
   a second bus;
   a third bus with two-wired interface;
   a first controller coupled between said first bus and second bus and having a master controller of said first bus and a slave controller of said third bus;
   a second controller coupled with said second bus for coordinating data transfers among a central processing unit, a main memory, a video graphic adapter controller and said first bus; and
   an input-output device coupled with said first bus and having a master controller of said third bus;
   wherein said third bus is coupled between said input-output device and said first controller, said input-output device is configured to generate a clock signal and transmit said clock signal through a first line of said two-wired interface and a data signal defined by a protocol of said third bus through a second line of said two-wired interface to said slave controller of said third bus, in order to drive said master controller of said first bus to access said hardware device.

16. The architecture of claim 15 wherein said first bus is a peripheral component interconnect bus, said second bus is a V-Link bus and said third bus is a system management bus.

17. The architecture of claim 15 wherein said controller further comprises a data buffer for temporarily storing data being transferred between said slave controller of said third bus and said master controller of said first bus therein.

18. The architecture of claim 15 wherein said input-output device is one selected from a local area network adapter and a debug card.

19. The architecture of claim 15 wherein said second controller and said central processing unit are integrated into a single chip.

20. The architecture of claim 15 wherein said first controller is a southbridge chipset and said second controller is a northbridge chipset.

21. The architecture of claim 15 wherein said hardware device comprises one selected from a group consisting of said central processing unit, said main memory and said video graphic adapter controller.

22. The architecture of claim 15 wherein said hardware device is coupled with said first bus.

23. The architecture of claim 15 wherein said hardware device is coupled with said first bus through a fourth bus and a bus bridge device.

24. The architecture of claim 23 wherein said bus bridge device is integrated into said first controller.

25. The architecture of claim 23 wherein said fourth bus is one of an industry standard architecture bus and a low pin count bus.

26. A controller which is coupled with a first bus, a second bus with two-wired interface, and an input-output device through said second bus, said input-output device which is also coupled with said first bus includes a master controller of said second bus, comprising:
   a master controller of said first bus;
   a two-wired serial interface of said second bus which communicates with said master controller of said second bus through said second bus;
   a slave controller of said second bus for receiving a data signal generated by said master controller of said second bus to drive said master controller of said first bus to access a hardware device coupled to said first bus.

27. The controller of claim 26 further comprising a data buffer.

28. The controller of claim 26 wherein said first bus is a peripheral component interconnect bus and said second bus is a system management bus.

29. The controller of claim 26 wherein said controller comprises one of a northbridge chipset and a southbridge chipset.

30. The controller of claim 26 wherein said input-output device comprises one of a local area network adapter and a debug card.

31. The controller of claim 26 wherein said hardware device is coupled with said first bus.

32. The controller of claim 26 wherein said hardware device is coupled with said first bus through a third bus and a bus bridge device.

33. The controller of claim 32 wherein said bus bridge device is integrated into said controller.

34. The controller of claim 32 wherein said third bus is one of an industry standard architecture bus and a low pin count bus.

35. The controller of claim 26 wherein said hardware device comprises one selected from a group consisting of a central processing unit, a main memory and a video graphic adapter controller.

36. A method of accessing a hardware device which is coupled with a first bus by an input-output device coupled with said first bus through a two-wired serial interface, comprising the steps of:

generating a clock signal, and transmitting a data signal defined by a protocol of said two-wired serial interface from a master controller of said two-wired serial interface through said two-wired serial interface with reference to said clock signal;

receiving said clock signal and said data signal by a controller having a master controller of said first bus and a slave controller of said two-wired serial interface; and according to a command and a data byte in said data signal, driving said master controller of said first bus to access said hardware device according to a read/write cycle of said first bus.

37. The method of claim 36 wherein said two-wired serial interface is a system management bus, and said master controller of said two-wired serial interface is integrated into an input-output device.

38. The method of claim 36 wherein said controller is one of a northbridge chipset and a southbridge chipset.

* * * * *